United States Patent [19]
Merritt, Jr.

[11] 4,075,434
[45] Feb. 21, 1978

[54] KEY TELEPHONE PRIVACY EXCLUSION APPARATUS

[75] Inventor: George Albert Merritt, Jr., Irvine, Calif.

[73] Assignee: San/Bar Corporation, Santa Ana, Calif.

[21] Appl. No.: 670,415

[22] Filed: Mar. 25, 1976

[51] Int. Cl.² .......................................... H04M 1/68
[52] U.S. Cl. .................................. 179/99; 179/17 B; 179/18 AD
[58] Field of Search ............. 179/99, 18 DA, 18 AD, 179/17 B, 18 F, 18 FA

[56] References Cited
U.S. PATENT DOCUMENTS

| | | | |
|---|---|---|---|
| 3,514,544 | 5/1970 | Chambers, Jr. | 179/17 B |
| 3,725,601 | 4/1973 | Jetzt et al. | 179/99 |
| 3,860,763 | 1/1975 | Sudoh et al. | 179/18 DA |
| 3,941,943 | 3/1976 | Matheny | 179/99 |
| 3,961,144 | 6/1976 | Hirate | 179/18 AD |

Primary Examiner—Kathleen H. Claffy
Assistant Examiner—Gerald L. Brigance
Attorney, Agent, or Firm—Jackson & Jones Law Corporation

[57] ABSTRACT

Privacy by way of excluding all other key set talking circuits (T-R) from the seized line in a standard key set or conference key set system is obtained by providing a privacy exclusion circuit at each key set in the system. The exclusion circuit at the key set which seizes a particular T-R line first causes the voltage on the A lead associated with that line to drop below a certain critical value, thereby causing all the other exclusion circuits in all the other key sets to open their respective talking circuits if an attempt is made to access the occupied line. In order to permit other key sets to access the occupied line, the key set first to seize the line can, without relinquishing the line, permit the voltage on the respective A lead to rise above the critical value, permitting another key set access. Upon such access occurring by the other key set all other key sets are again excluded because the voltage on that particular A lead again drops below the critical value. A third key set may be allowed access to the line in the same way. Each time access is permitted, the light under the hold button on the key set turns on to indicate to the key set user that the exclusion function has been deactivated.

In the case of an intercom key set system, the exclusion circuit of the present invention provides an artificial A lead. This A lead is required to prevent the exclusion circuit from opening the T-R leads when using intercom. Privacy on intercom is not provided by this arrangement. However, by a slight modification, the present invention will provide privacy on the intercom circuit.

10 Claims, 4 Drawing Figures

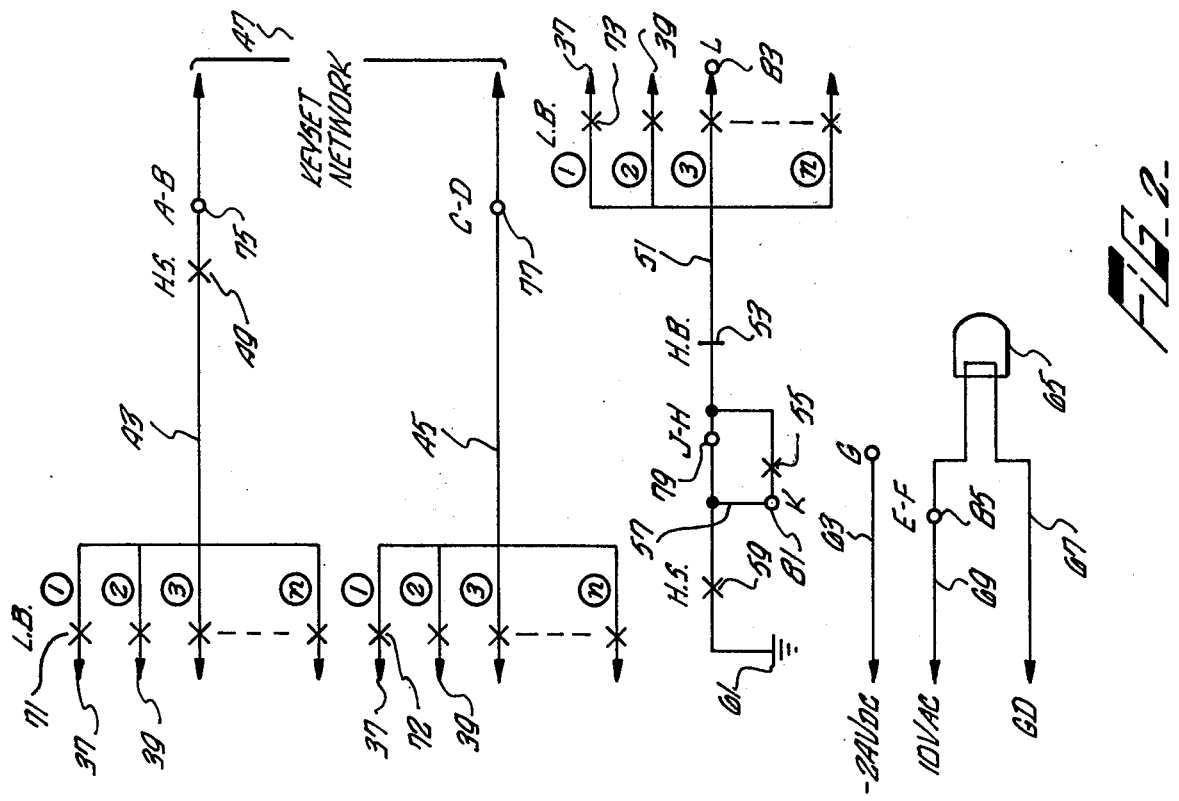
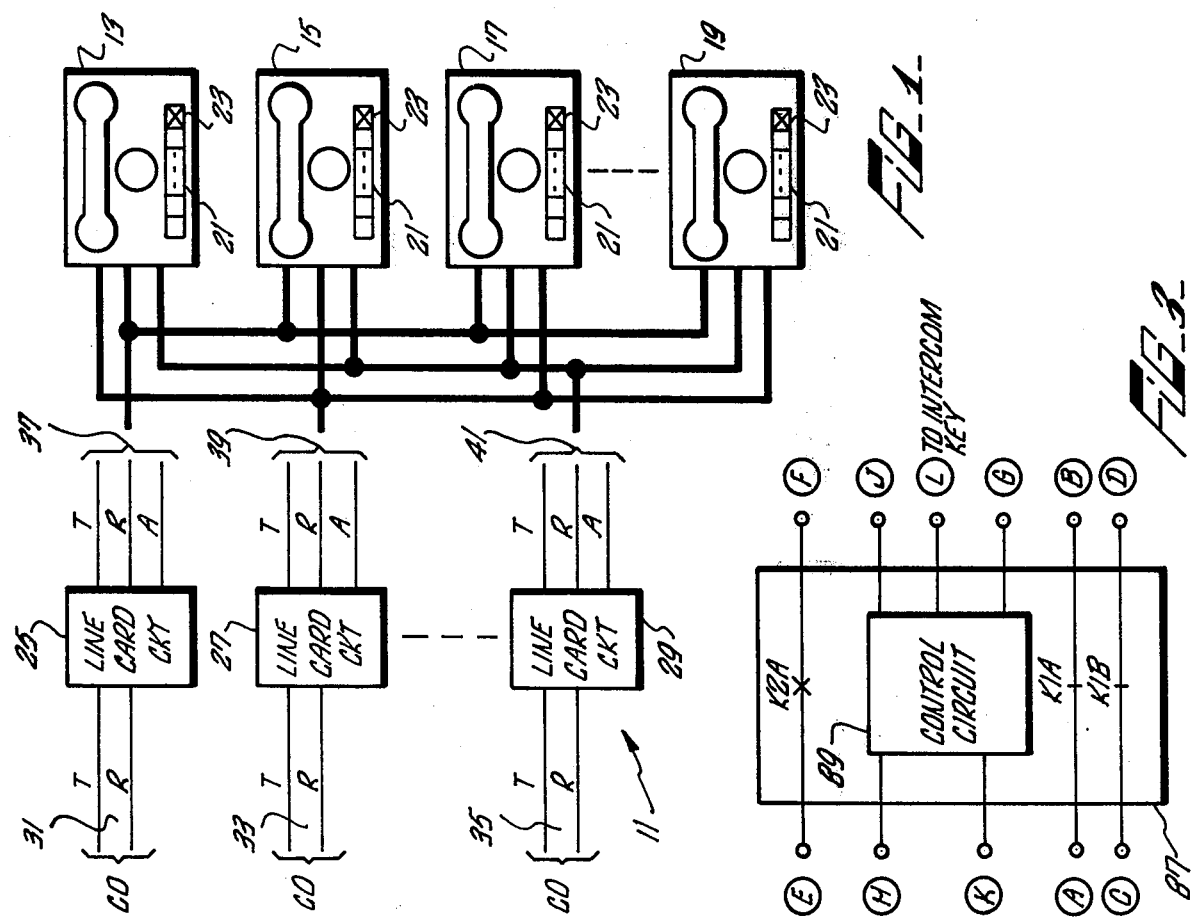

KEY TELEPHONE PRIVACY EXCLUSION APPARATUS

BACKGROUND OF THE INVENTION

The present invention relates to privacy apparatus for telephone systems, and more particularly pertains to exclusion circuits located at subscriber sets, wherein the first subscriber in a talk circuit loop to go off-hook excludes all other subscribers from becoming connected to that talk loop.

In the field of privacy exclusion it has been the practice to employ a separate and additional means at each subscriber key set to activate and deactivate an exclusion feature. The present invention employs the line and hold button switches normally present at all key sets for this purpose. When prior art exclusion circuits are being deactivated in order to permit a third party access they must hold down the deactivating switch until the third party joins the line. Normally the exclusion circuits of the prior art require a separate signalling device to indicate to the user that his exclusion circuit is either operating or inactive. The present invention utilizes the light under the hold button of the key set for such purpose, thereby eliminating the requirement of an extra indicator. Generally, prior art exclusion circuits are complicated and expensive. The exlusion apparatus of the present invention is compact and relatively inexpensive.

OBJECTS AND SUMMARY OF THE INVENTION

One object of this invention is to provide an inexpensive and reliable privacy exclusion circuit for key set systems.

Another object of this invention is to provide a privacy exclusion circuit that gives the key set first to seize a line control over that line until it is released.

A further object of this invention is to provide a privacy exclusion circuit for key set system that permits the key set that has seized the line to allow access to it by another key set without running the risk of losing the line.

Yet another object of this invention is to provide a privacy exclusion circuit for key set systems that utilizes a simple momentary depression of the hold button on the key set to permit another key set access to the seized line.

Still a further object of this invention is to provide a privacy exclusion circuit for use in intercom systems utilizing a single common talk circuit that utilizes a simple momentary depression of the hold button to permit another subscriber set access to the seized talk circuit.

Yet another object of this invention is to provide a privacy exclusion circuit for key set systems which operates automatically to exclude subsequent key sets from a seized talk circuit, is easy to operate when access is to be permitted, and gives the key set operator a visual indication that the exclusion circuit is released.

These objects and the general purpose of this invention are accomplished by providing an exclusion circuit at each key set in the system. Each exclusion circuit is connected into the common segments of the tip, ring and A lead circuits of its key set.

Upon A lead current being sensed at the key set as a result of a key set going off-hook and depressing a particular line button, the exclusion circuit operates to prevent the exclusion circuits' normally closed contacts in the tip and ring lines from opening. At the same time, the voltage in the A loop to all the other key sets is changed so that if any other key set goes off-hook on the seized line, the voltage now on the A lead will be insufficient to prevent the normally closed contacts in the tip and ring lines of that key set from opening and, therefore, that key set will be excluded from the tip-ring talking circuit.

Assuming that the first key set that seized the talk circuit wishes to permit another key set in the system access to the T-R circuit, by holding down the line button while the hold button is momentarily depressed, the voltage on the A lead for that line will raise sufficiently to cause the exclusion circuit in the second key set to operate and prevent that exclusion circuit's normally closed contacts in the tip and ring lines from opening when the third key set goes off-hook on that line. However, the voltage on the A lead will subsequently again be changed so as to exclude all other key sets. Each time the release of the exclusion circuit is affected in this way, the light under the hold button is ignited to indicate the same. When the second key set is on the line, the hold button light is extinguished.

For intercom systems wherein no line cards or A leads are utilized and all subscribers are on a single T-R circuit, a psuedo A lead is provided by tying all the intercom line button A leads from each key set to a common −24 volt source through a common resistor. The exclusion circuit will operate as above described. The intercom line can be seized by any party at any time if that party first sets the privacy release feature. Upon the called party answering, the exclusion circuit is again set, thereby preventing another party access to the intercom line.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 is a block diagram representation of a standard key system.

FIG. 2 is a block diagram representation of a key set circuit.

FIG. 3 is a block diagram representation of the exclusion apparatus of the present invention.

DESCRIPTION OF THE PREFERRED EMBODIMENT

Figure 4:
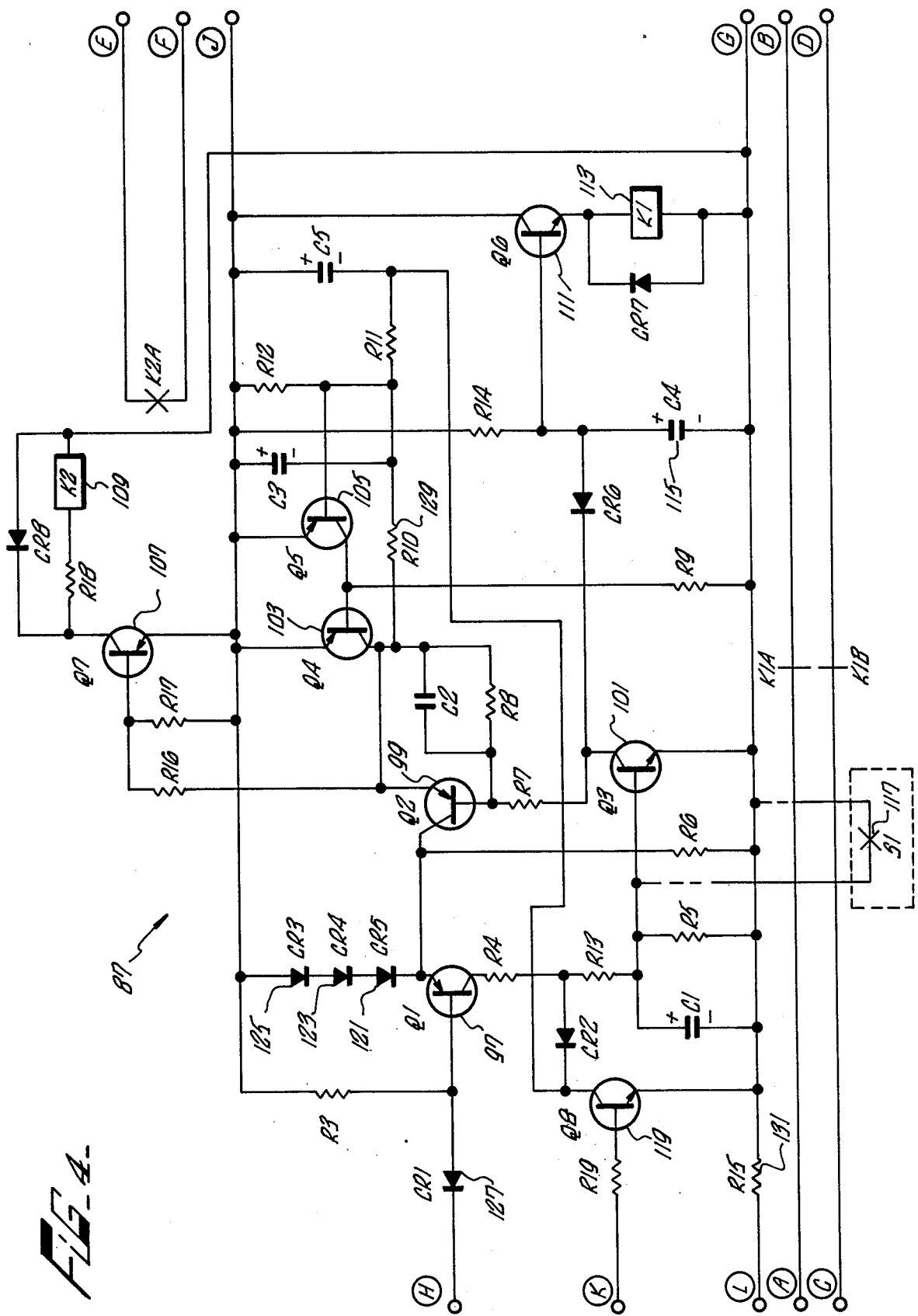
FIG. 4 is a circuit diagram of the exclusion apparatus of the present invention.

A key system 11 of the type in which the exclusion apparatus of the present invention finds utility is illustrated in FIG. 1. Basically, the key system at the subscriber's installation comprises a plurality of key sets 13, 15, 17, 19, each key set having a plurality of line buttons 21 and a hold button 23 thereon. A plurality of independent talk circuits 31, 33, 35, made up of tip and ring lines come from the central office (CO) to the subscriber's site and are usually terminated at their respective line card circuits, 25, 27 and 29. Each line card circuit supplies a respective tip, ring and A lead 37, 39, 41, to each of the key sets 13, 15, 17 and 19, in the key set system of the subscriber.

As can be seen in FIG. 2 which schematically illustrates the basic circuit for a single key set the tip ring and A leads 37 from one line card circuit 25 are paralleled with the tip ring and A leads 39 of another line card circuit 27 and so on, with all the other line card circuits that are utilized. Each key set has a plurality of line buttons (LB) 1, 2, 3, n, each line button being associated with a particular tip, ring and A lead group from a particular line card circuit. Thus, for example, line button 1 is associated with tip ring and A lead group 37 from line card 25. Depression of line button 1 closes normally open contacts 71, 72 and 73, thereby connecting the tip line from line card circuit 25 through a closed contact 71 to line 43 in the key set, the ring line from line card circuit 25 through closed contact 72 to line 45 of the key set, and the A lead from the line card circuit 25 through closed contact 73 to line 51 of the key set.

In addition to the line button switches each key set has a hook switch (HS) and a hold button switch (HB). The hook switch has a set of normally open contacts 49 located in line 43 and normally open contacts 59 located in line 51 of the key set. On taking the receiver off hook these hook switch contacts are closed connecting the key set network 47 to the lines, 43, 45 of the key set going to the line buttons and through the line button contacts to the line card and central office circuit. The closing of hook switch contacts 59 causes a −24 volts, supplied on the A lead by the line card circuit through the line button contact 73 to be connected to ground 61.

The hold button has a normally closed set of contacts 53 and a normally open set of contacts 55. Upon depression of the hold button the A lead circuit is broken by the opening contacts 53 and the closing contacts 55. Normally contacts 55 are shorted, as shown. As the hold button is depressed, because of the button interlock mechanism common to all key sets, the talk circuit of the key set is also opened by way of opening the particular line button contacts that were activated.

The part of FIG. 2 described so far comprises the basic elements which are used by a standard key set. Lines 63, 69 and 67, as well as lamp 65, are present in each key set, but are generally not used. Lamp 65 is the lamp under the hold button of the key set.

The exclusion apparatus of the present invention is illustrated in block form in FIG. 3. The apparatus 87 is inserted into the key set circuit of FIG. 2. The exclusion apparatus 87 basically comprises a control circuit 89 and 3 relay driven switches K1A, K1B and K2A. The exclusion apparatus 87 is connected to the circuit at each subscriber key set as follows. AT point 75 in lead 43, line 43 is broken and connected to respective opposite ends of line A–B. At point 77 in line 45, line 45 is broken and connected to respective opposite ends of line C–D of the exclusion apparatus. At point 79 on line 51, line 51 is broken and connected to the respective opposite ends of line J-H of the exclusion apparatus 87. At point 81, line 57 is removed from connection with line 51 and connected to line K of the exclusion apparatus 87. At point 85 on line 69, line 69 is broken and respective ends thereof connected to line E-F of the exclusion apparatus 87. Line 63 is connected to line G of the exclusion apparatus 87. Assuming there is an intercom circuit in the key set installation and that line button 3 is that intercom circuit, point 83 of the A lead in the subscriber set is connected to line L of the exclusion apparatus 87. Line 63 which runs back to the respective line card circuit is connected to the −24 volt DC source found at that line card circuit. Line 69 is connected to a 10 volt AC source found at the line card circuit and line 67 is connected to a convenient ground.

The circuitry for the exclusion apparatus 87, including the control circuit 89 is schematically illustrated in FIG. 4. The control circuit 89 consists of a plurality of transistor switches, Q1 through Q8, a plurality of diodes CR1 through CR8, and a pair of relays K1 and K2, along with the passive resistance and capacitive elements shown. The operation of the circuit of FIG. 4 in a typical key set installation will now be described.

Assuming that the particular key set at which the exclusion circuit 87 of FIG. 4 is located is in the on-hook, or idle condition, a −24 volts DC will be connected to terminal G, 10 volts AC will be connected to terminal E, terminal J is floating because of the open hook-switch contacts 59 (FIG. 2), terminal H is floating because of the open line button contacts, terminal K is disconnected from terminal H because of the open hold button contacts 55, terminal L is connected to the open line button 3 of the key set, terminal A is connected to open hook switch contact 49, terminal C is connected to the open line buttons of the ring lead 45, and terminals B and D go to the key set network (talk circuit). In this condition, no current is drawn by the circuit and all transistor switches are in their normally quiescent "off" state.

Upon the key set going off-hook, contacts 49 and 59 of the hook switch close, causing a ground 61 to be connected to terminal J. As a result of a ground on terminal J, ground is applied to the emitter of Q4 transistor switch 103, and this, in combination with a −24 volts on terminal G being applied to the base of switch 103 through resistor R9 causes the Q4 switch to turn on. With Q4 switch 103 on, the collector of Q4 has a certain voltage thereon which is supplied as a reference to the emitter of the Q2 transistor switch 99.

Upon depressing any line button on the key set the −24 volts from the respective line card circuit will be supplied to terminal H on the respective A lead. As a result current will flow through resistor R3 and CR1 diode 127 causing a voltage at the base of Q1 switch 97 that will turn it on. Upon transistor switch Q1 turning on, current will flow through resistors R4 and R13 to the base of Q3 transistor switch 101 causing Q3 to turn on. As a result of Q3 turning on, current will flow through resistor R7 causing Q2 transistor switch 99 to turn on. Current will flow through diode CR6, reducing the voltage at the base of Q6 transistor switch 111 sufficiently to keep it off if it has not yet turned on, and turn it off if it has turned on, thereby leaving K1 relay 113 unactivated and its contacts K1A and K1B closed.

With Q2 switch 99 and Q4 switch 103 both on, the CR3, CR4, CR5 diodes 125, 123, 121, respectively, are effectively shorted out thereby causing the voltage at terminal H to rise to approximately −1.2 volts. This −1.2 volts is created by the drop across CR1 diode 127 and the emitter base junction of Q1 transistor switch 97. The voltage drop across the diodes 121, 123 and 125 is approximately 1.8 volts. By removing this voltage drop, the voltage at terminal H is effectively raised from about −3 volts to −1.2 volts. As a result of this occurring the subscriber set has seized the line circuit.

If another subscriber key set wishes to get on this line, that has been seized, and has a similar exclusion circuit located at his key set, upon going off hook, his Q4 transistor 103 will turn on and his Q6 transistor switch 111, after a short time delay determined by resistor R14 and capacitor C4 115 will turn on, causing K1 relay 113 to activate, thereby opening K1A and K1B contacts and disconnecting that key set's talk circuit from the line. Q6 transistor switch 111 is allowed to turn on and activate K1 relay 113 because the voltage on the A lead for that particular line circuit is at about a −1.2 volts. This is what the voltage at terminal H of the second key set of the system which is attempting to get on the seized line will see. This voltage is insufficient to turn on Q1 transistor switch 97. Therefore, it does not turn on Q3 transistor switch 101 which, as already described, holds Q6 transistor 111 off, or turns it off. Thus, the second subscriber key set in the system attempting to get on the same line will be excluded as a result of his talk circuit being opened by K1A and K1B contacts. It should be remembered that this would be a third party to the conversation.

The reason that the −1.2 volts seen by the third party key set in the system, at his terminal H, is insufficient to turn on transistor switch Q1 is because of the combination of diodes CR1, 3, 4 and 5. At least −3 volts at terminal H must be present in order to cause sufficient current to flow in the base circuit of Q1 transistor switch 97 to turn it on.

Assume now that the first subscriber key set, the set which has seized the line, has his called party connected to his talk circuit. This called party may be in another system or may be another subscriber key set in the present system which is powered off of its own line card circuit. Assume that the calling key set wishes to bring in a third party located at the key set system to the conversation. That party would be so advised and then must wait until the calling, or first subscriber, key set has set his exclusion circuit in a manner that will permit the third party key set to get on the line.

In order to set his exclusion circuit, the key set operator must momentarily depress the hold button on his key set while maintaining his line button depressed. As can be seen from FIG. 2, the hold button contact 53 will open and hold button contact 55 will close. As a result of hold button contact 53 in the A lead 51 opening, the −24 volts supplied from the line card circuit is removed from contact H of the exclusion circuit 87. However, because of the closing of contact 55, terminal K of the exclusion circuit is effectively connected to terminal H. The closure and opening of the contacts is almost simultaneous. As a result, current will flow to the base of Q8 transistor 119 providing a voltage through resistor R19 sufficient to turn on Q8 transistor 119. Q1 transistor switch 97 remains on even though the −24 volts supply is disconnected from terminal H because of the current path to the base of Q8 transistor 119. With Q8 transistor switch 119 on, current flows through the collector of Q8 transistor switch 119 through resistor R11 to the base of Q5 transistor switch 105, turning it on. Upon transistor switch Q5 turning on, Q4 transistor switch 103 will turn off. By Q4 transistor switch 103 turning off, the hard reference supplied by the collector of Q4 switch 103 to the emitter of Q2 switch 99 is removed, thereby permitting the voltage drop across resistors R16 and R17 to rise to a level that approaches the voltage drop across diodes 121, 123 and 125. Resistors R16 and R17 are through Q2 switch 99, in parallel with CR3, CR4, CR5 diodes 125, 123 and 121. As a consequence of this, and the fact that the Q4 switch 103 is turned off, the diodes are no longer shorted out, and they will drop approximately 1.8 volts. As a result, the voltage at terminal H, even while transistor switches Q1, Q2 and Q3 are conducting, or on, goes down to approximately −3 volts.

As a result of Q4 switch 103 turning off, the voltage drop across resistors R16 and R17 causes Q7 transistor switch 107 to turn on, activating K2 relay 109 which closes contacts K2A. The closing of contacts K2A, as can be seen from FIG. 2, activates light 65 under the hold button. Also, as a result of Q4 switch 103 being off, the voltage at the collector of Q4 switch 103 is fed back through R10 resistor 129 to the base of Q5 switch 105 to maintain it in its on state. With light 65 under the hold button of the key set on, the operator of that key set is informed that he has set his exclusion release and the other subscriber may get on his line. It should be remembered that this entire action happens as a result of the key set operator momentarily depressing the hold button while he prevents the line button from becoming disengaged.

With about −3 volts at terminal H, this −3 volts is supplied to all the other paralleled A leads in the system, and any other key set in the system may then be permitted access. That is, their respective exclusion circuits will operate if they go off-hook by Q1 turning on, thereby turning on Q3, thereby turning on Q2, and thereby turning on Q4, Q3 keeping Q6 off.

As a result of Q8 transistor switch 119 turning on, Q3 transistor switch 101 is turned off through CR2 and, consequently, Q2 transistor switch 99 is also turned off.

Upon releasing the hold button, after depressing it, hold button contacts 53 again close and contacts 55 open, thereby disconnecting the H and K terminals of the exclusion circuit, turning off Q8 transistor switch 119 and reconnecting the −24 volt source to the H Terminal. Consequently, transistor switches 101 and 99 turn back on. However, transistor switch Q4 remains off because Q5 transistor switch is maintained on by way of resistor R10. Upon the third party key set subscriber going off-hook, his exclusion circuit will operate in the manner above described, and will cause the voltage on A lead to rise to approximately −1.2 volts. As a result, the voltage appearing at terminal H of the first key set will go up to a −1.2 volts from a −3 volts.

The Q1 transistor switch 97 of the first subscriber set, once on does not turn off, however, because the resistances R16 and R17 maintain Q1 switch 97 biased on. The voltage at the emitter of Q2 transistor switch 99 and the collector of Q4 transistor switch 103 will no longer be sufficient to sustain the bias at the base of Q5 transistor switch 105. Consequently, Q5 transistor switch 105 will open, thereby permitting Q4 transistor switch 103 to turn on causing the CR3, CR4, CR5 diodes 125, 123, 121 respectively to be short circuited. In addition, with Q4 transistor switch 103 on, the bias at the base of Q7 transistor switch 107 is insufficient to maintain it on thereby allowing it to turn off and deactivating K2 relay 109, thereby opening contacts K2A. This extinguishes the hold button lamp 65. This is an indication to the subscriber key set that the third party key set has come on the line.

From the above description it follows that if a fourth party key set in the system is to be allowed to share the line with these first two subscriber key sets, both of these first two subscriber key sets must set their privacy release above described, allowing the fourth party to come on. Upon the fourth party coming on, the exclusion circuit of the first two subscriber key sets will be reset in the manner above described. This can be repeated any number of times.

The $S_1$ microswitch 117 in FIG. 4 is shown as tentatively connected between the base and emitter of $Q_3$ transistor switch 101. This microswitch is utilized only when a conference key set is involved. A conference key set is characterized by the lack of a mechanical interlock mechanism between the key set line buttons, thereby permitting the depression of two or more line buttons at the same time. This is not the case in a standard key set. The microswitch merely senses when more than one line button is depressed at the same time, and in response thereto causes the contacts 117 of the microswitch to close, thereby opening Q3 transistor switch 101 and allowing Q6 transistor switch 111 to turn on, energizing K1 relay 113 which in turn opens the K1A and K1B contacts in the talk circuit.

In key set systems where one of the line buttons on a key set is for an intercom line which has no line card circuit associated therewith and therefore no A lead, one side of that line button 83 is connected to terminal L of the exclusion circuit. Because a −24 volt DC source is connected to terminal G of the exclusion circuit, this voltage will appear as if an A lead from a line card circuit were connected to terminal H of the exclusion circuit 87 and consequently the exclusion circuit will operate on the conference or intercom line in a manner identical with the manner it operated on a non-intercom line, having a line card circuit. However, privacy is not provided on intercom in this case, since each phone then has its own A lead.

It is possible, with the present invention, to provide privacy on intercom for all key set units that are adapted to use the present exclusion circuit invention. Only minor modifications need be made. Assume that line button 3 is connected to the intercom line which is generally characterized as common for all the key sets in a subscriber installation. By taking all the line button 3 A leads from each key set, running them to a central location and tying them to a common resistor which is in turn connected to a −24 volt source, that intercom A lead will look like a line card to each subscriber key set.

Because the exclusion apparatus of the present invention is located at each of the subscriber key sets, if one key set attempts to dial another on the intercom line, the second key set will be unable to answer the call because his exclusion circuit will exclude him from the line. The exclusion apparatus of the present invention alleviates this problem, which is a common problem that has to be faced by systems that provide privacy on the intercom line. The present invention solves this problem as follows. The operator at the calling key set must set his privacy release. In other words, he must momentarily depress his hold button while at the same time depressing his line button prior to dialing the intercom number. This releases his exclusion circuit by turning on Q5 transistor switch 105 and enables the exclusion circuit of the answering key set to permit that key set to answer. Upon the answering key set going off hook, both exclusion circuits are reset and no other key set may come on to the intercom line.

SUMMARY

What has been described is an inexpensive, reliable, privacy exclusion circuit which can be used in key set systems to provide privacy on any of the line circuits or on any intercom circuit that is part of such a key set system. Privacy is provided in a manner that gives the party first seizing the line control over that line until he releases it. The party in control of the seized line can permit others access to the line by a simple momentary depression of the hold button.

It should be understood, of course, that the foregoing disclosure relates only to a preferred embodiment of the invention and that numerous modifications may be made therein without departing from the spirit and scope of the invention as set forth in the appended claims.

What is claimed is:

1. In key set subscriber systems wherein a plurality of central office lines go to a plurality of key sets through respective line card circuits which supply respective A leads to each of said key sets, each key set having a line button for each central office line and A lead terminating thereat and one hold button, privacy exclusion apparatus for at least two key sets in said system, said privacy exclusion apparatus comprising:
   at a first key set;
      means responsive to said first key set being off-hook and connected to a central office line, for sensing a voltage level on its A lead, said voltage level indicating whether a second key set is utilizing said line;
      means responsive to said sensing means detecting a voltage level indicative of said second key set utilizing said line, for opening the line circuit of said first key set; and at a second key set;
      means responsive to a momentary hold button depression at said second key set for providing a voltage level on the A lead of said first key set, said voltage level indicating that said second key set is not utilizing said line.

2. The privacy exclusion apparatus of claim 1 further comprising:
   means responsive to said momentary hold button depression for igniting the hold button lamp.

3. In key set subscriber systems wherein a plurality of central office lines go to a plurality of key sets through respective line card circuits which supply respective A leads to each key set, each key set having a line button for each line, an A lead terminating thereat and a hold button, privacy exclusion apparatus connected to tip, ring and A leads of at least two key sets in said system, said privacy exclusion apparatus comprising:
   at a first key set;
      means responsive to said first key set being off-hook and connected to a particular line, for opening the tip and ring circuit for that key set;
      means responsive to said first key set being off-hook and connected to said line, for sensing a voltage level on its A lead, said voltage level indicating whether a second key set is utilizing said line;
      means responsive to said sensing means for disabling said opening means if another key set is not utilizing said line; and at a second key set;
      means responsive to a momentary hold button depression at said second key set for providing a voltage level on the A lead of said first key set, said voltage level indicating that the second key set is not utilizing the line.

4. The privacy exclusion apparatus of claim 3 further comprising:
   means responsive to said momentary hold button depression on said key set for igniting the hold lamp.

5. The privacy exclusion apparatus of claim 3 wherein said sensing means comprises:

a transistor switch connected to the A lead of said first key set.

6. Privacy exclusion apparatus for use at each key set in a key set system, having tip, ring and A leads supplied to each key set, said exclusion circuit comprising:
   means responsive to its respective key set being off-hook and connected to a particular line for sensing whether another key set is utilizing said line;
   means responsive to said sensing means for opening the tip and ring circuit for said key set whenever another key set is sensed;
   means responsive to said sensing means for changing the voltage level on the A leads whenever another key set is not sensed; and
   means responsive to a momentary hold button depression on said key set for providing a voltage level on the A leads sufficient to prevent the sensing of another key set on the line even though another key set is utilizing the line.

7. The privacy exclusion apparatus of claim 6 wherein said sensing means comprises:
   means responsive to the voltage level on said A leads.

8. The privacy exclusion apparatus of claim 6 further comprising:
   means responsive to said momentary hold button depression on said subscriber set for igniting the hold lamp.

9. The privacy exclusion apparatus of claim 6 wherein said voltage level changing means comprises:
   impedance devices placed into the A lead circuits.

10. The privacy exclusion apparatus of claim 9 wherein said impedance devices are diodes.

* * * * *